United States Patent [19]
Linnebur et al.

[11] Patent Number: 5,782,230
[45] Date of Patent: Jul. 21, 1998

[54] COMBINATION STOVE AND BARBECUE GRILL

[75] Inventors: David H. Linnebur, Derby; Douglas A. Lynn, Wichita; Keith V. Skidmore, Newton, all of Kans.

[73] Assignee: The Coleman Company, Inc., Wichita, Kans.

[21] Appl. No.: 727,899

[22] Filed: Oct. 9, 1996

[51] Int. Cl.⁶ .................. A47J 37/00; F24C 3/00
[52] U.S. Cl. .............. 126/41 R; 126/39 K; 126/38; 99/447
[58] Field of Search .............. 126/41 R, 38, 126/39 K, 41 A, 39 R, 39 D, 9 R; 99/450, 449, 446, 447, 448

[56] References Cited

U.S. PATENT DOCUMENTS

| | | | |
|---|---|---|---|
| 1,491,570 | 4/1924 | Thornblade | 126/39 R |
| 4,020,323 | 4/1977 | Dills | 219/405 |
| 4,334,462 | 6/1982 | Hefling | 99/385 |
| 4,436,081 | 3/1984 | Hefling | 126/285 A |
| 4,587,948 | 5/1986 | Haglund | 126/41 R |
| 4,683,867 | 8/1987 | Beatty | 126/41 R |
| 4,762,059 | 8/1988 | McLane, Sr. | 99/445 |
| 4,881,520 | 11/1989 | Hefling | 126/44 |
| 5,101,805 | 4/1992 | Noh | 126/41 R |
| 5,265,586 | 11/1993 | Salerno | 126/41 R |
| 5,279,277 | 1/1994 | Barker | 126/41 R |
| 5,313,877 | 5/1994 | Holland | 99/446 |
| 5,368,009 | 11/1994 | Jones | 126/41 R |
| 5,413,090 | 5/1995 | Mashburn et al. | 126/41 R |
| 5,529,798 | 6/1996 | Clark | 126/41 R |
| 5,546,853 | 8/1996 | Heil | 126/41 R |

OTHER PUBLICATIONS

Owner's Manual and Operating Instructions for Easy–Lite® Barbecue (published Apr., 1977).

P. 55 from Camping World Catalog for Portable Grilling Apparatus showing Firelight II Gas Grill/Campstove made by DuCane Co. (published 1995); p. 63 from 1996 Camping World Catalog.

P. 46 from The Canadian Coleman Company's parts catalog No. 18 for Model 5600—early version of Easy–Lite Barbecue (published Feb. 1988).

*Primary Examiner*—James C. Yeung
*Attorney, Agent, or Firm*—Fitzpatrick, Cella, Harper & Scinto

[57] ABSTRACT

A portable, outdoor cooking apparatus is provided which is capable of operating as both a stove and a barbecue grill. The cooking apparatus includes an elongated burner tube and a pivoting parabolic-shaped heat diffuser which can be rotated between an upright position in which the concave surface of the heat diffuser covers the burner tube for barbecue cooking and an inverted position in which the heat diffuser leaves the burner tube exposed directly to the cooking surface for stove cooking.

19 Claims, 3 Drawing Sheets

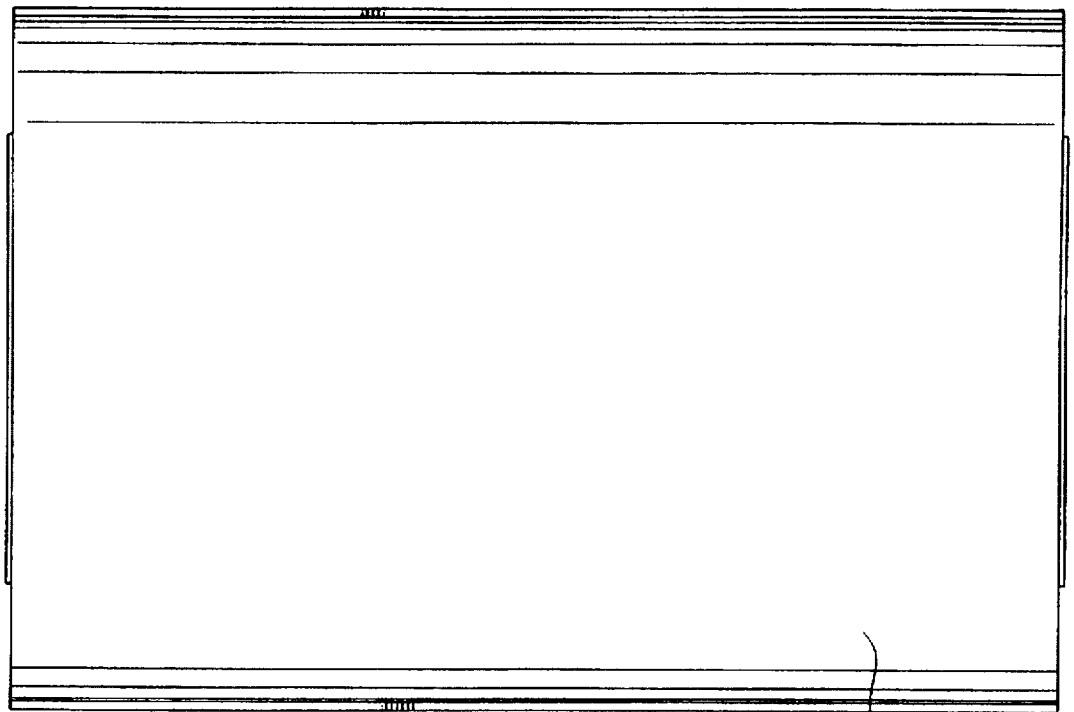
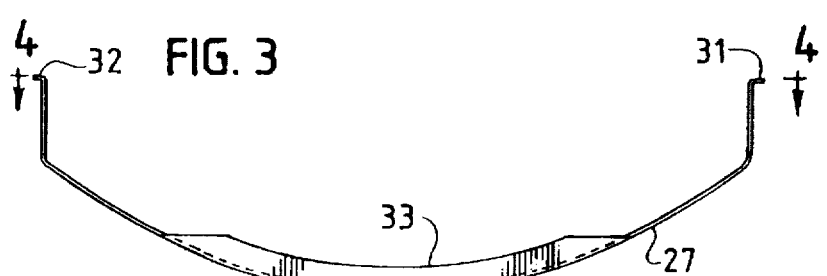
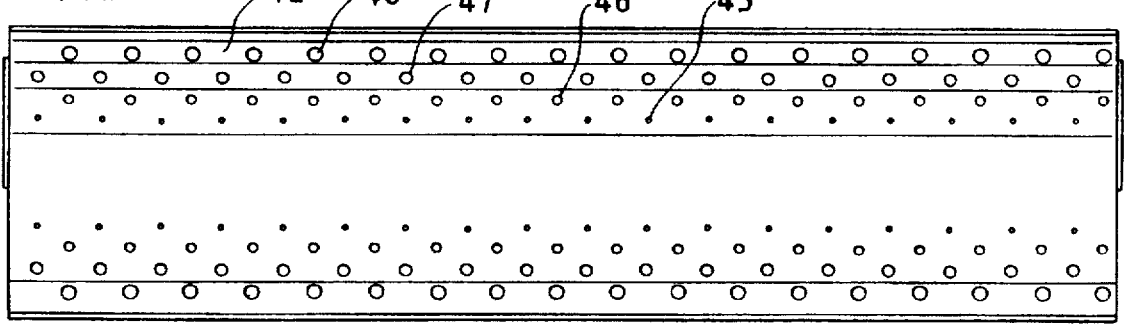

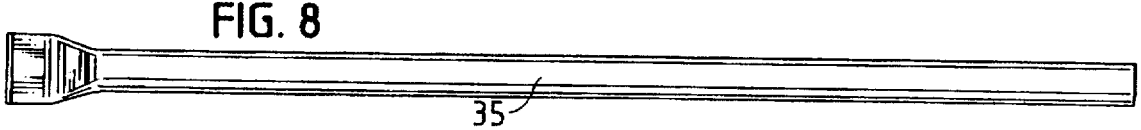
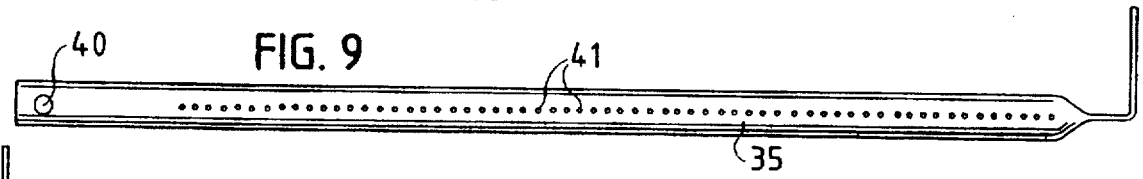
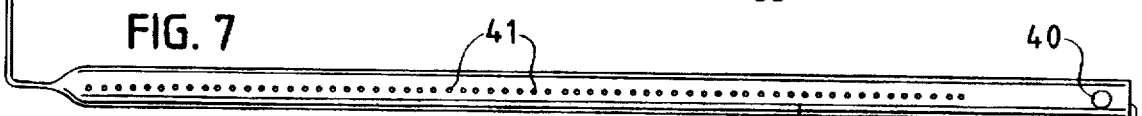
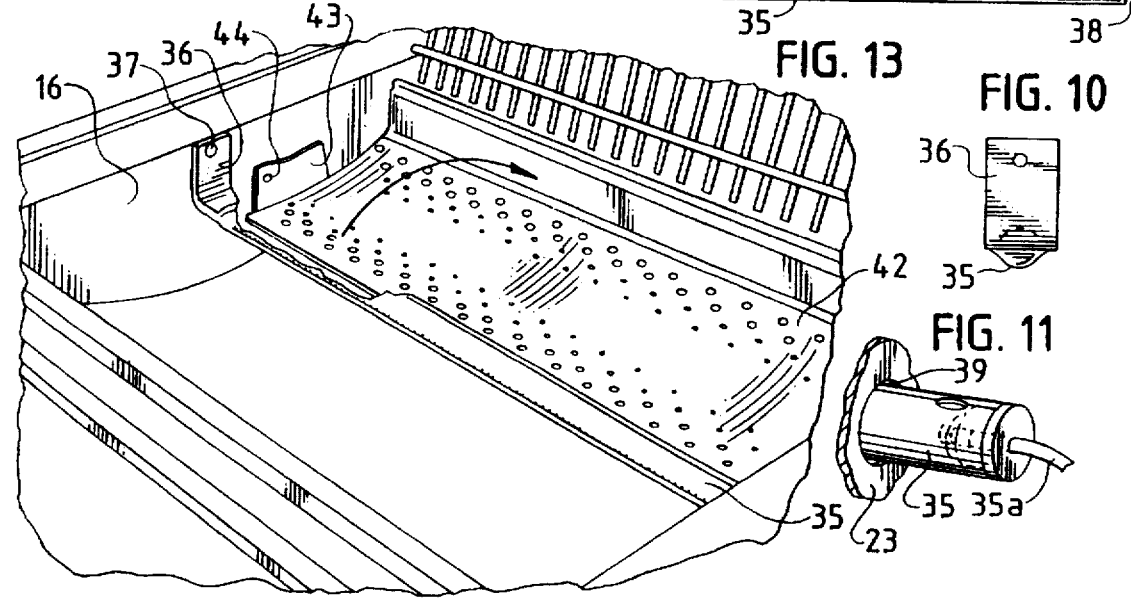
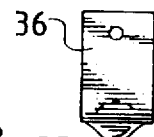
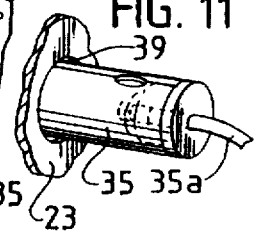
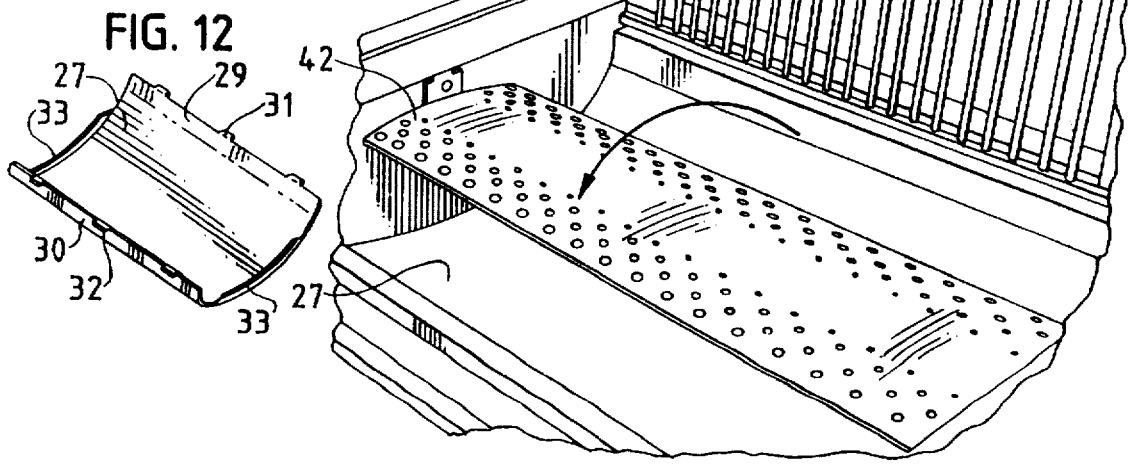

5,782,230

1

COMBINATION STOVE AND BARBECUE GRILL

BACKGROUND

1. Field of the Invention

This invention relates generally to a cooking apparatus and, more specifically, to a portable cooking apparatus operable either as a stove or a barbecue grill.

2. Description of the Prior Art

Advancements in portable outdoor cooking grills have been directed toward trying to provide the desirable taste which is imparted to foods when grease drippings from grilled foods fall onto a hot surface, vaporize, and flavor the foods, without the substantial cleanup required from conventional heat sources, such as charcoal or lava rock. Another goal has been to minimize the collection of grease drippings on metal surfaces inside the grills to lessen dangers of grease fires and further facilitate cleanup.

The prior art teaches that the use of a steel plate in a barbecue grill as an intermediate layer between a cooking grate and a burner can impart the desired taste to foods provided by more conventional heat sources. As grease drippings fall from the food onto the steel plate, they vaporize, as they would when striking charcoal or lava rocks, and the gases released help flavor such foods as steaks, hamburgers or hot dogs.

One problem with outdoor grills that has not been adequately met by the advancements in the prior art is that, when camping, people do not want to cook steaks, hamburgers or hot dogs for every meal. Many foods, particularly breakfast foods such as oatmeal or eggs, taste better when cooked over direct heat from a stove. Thus, it would be desirable to provide a portable outdoor cooking apparatus that is capable of operating as both a barbecue grill and a stove, but utilizes a single burner.

Some attempts have been made at providing a multipurpose cooking apparatus that can be used as both a grill and a stove. One such device has two separate cooking surfaces side-by-side in one housing, with one cooking surface used as a stove and one used as a barbecue grill. Another device uses a single heat source, but provides upper and lower cooking surfaces, with the upper surface used for grilling, and the lower surface inside the housing for oven cooking. None of the prior art grills, however, shows a device that uses a single burner and is operable as both a stove and a grill.

SUMMARY OF THE INVENTION

One object of the present invention is to provide a portable, outdoor combination stove and barbecue grill that does not utilize lava rock or charcoal. Another object of the present invention is to eliminate the need for campers to carry separate portable grills and stoves. A further object of the present invention is to provide a cooking apparatus that is easy to clean. Yet another object of the invention is to provide a cooking apparatus that is less harmful to the environment than conventional barbecue grills.

An elongated burner having many small, equally spaced apertures or burner ports in a row along its length is mounted in the housing of a portable cooking apparatus. Below the burner is a parabolic deflector which sits in the housing with its concave side facing upwards. A removable cooking grate is mounted on top of the cooking apparatus to provide a cooking surface. A heat diffuser having a parabolic shape is pivotally mounted to the side walls of the housing of the cooking apparatus. The heat diffuser includes several rows of apertures which increase in size as they approach the outer edges of the heat diffuser. There are no rows of apertures provided near or at the center of the heat diffuser. The apertures in the heat diffuser allow heat to pass through the diffuser and up to food on the cooking grate, but the combination of the parabolic shape of the diffuser and the position and size of the apertures prevent cooking grease from falling directly onto the burner and clogging the burner ports.

A user can rotate the heat diffuser between an upright position where the concave surface of the diffuser covers the burner of the cooking apparatus and the convex surface faces the cooking grate for barbecue grilling, and an inverted position where the heat diffuser uncovers the burner and substantially aligns with the parabolic deflector to allow stove cooking. The parabolic deflector serves several purposes. First, when the cooking apparatus is in the barbecue grilling mode the deflector collects excess grease drippings as they fall from foods through the cooking grate or off the sides of the pivotally mounted heat diffuser. Second, when the cooking apparatus is in the stove cooking mode the deflector cooperates with the concave surface of the heat diffuser to provide a substantially even and efficient flow of convective heat to food on the cooking grate by deflecting heat from the burner back up toward the cooking grate.

The cooking grate, the heat diffuser, the burner, and the parabolic deflector of the combination stove and barbecue grill are all easily removable to further simplify cleaning. These and other benefits of the present invention are made clear by reference to the drawing figures, detailed description of the preferred embodiment, and the appended claims.

BRIEF DESCRIPTION OF THE DRAWINGS

FIG. 3 is a right side view of a parabolic deflector for the combination stove and barbecue grill of the present invention.

FIG. 4 is a top view of the parabolic deflector shown in FIG. 3, taken in the direction of lines 4—4 of FIG. 3.

FIG. 5 is a right side view of the pivotally mounted heat diffuser shown in FIG. 2.

FIG. 6 is a bottom view of the pivotally mounted heat diffuser of FIG. 5, taken in the direction of lines 6—6 of FIG. 5.

FIG. 7 is a front view of a burner for the combination stove and barbecue grill of the present invention.

FIG. 8 is a top view of the burner shown in FIG. 7.

FIG. 9 is a rear view of the burner shown in FIGS. 7 and 8.

FIG. 10 is a left side view of the burner shown in FIGS. 7–9.

FIG. 11 is an enlarged perspective view of the interface of the burner tube shown in FIGS. 7–10 and a fuel tube.

FIG. 12 is a top perspective view of the parabolic deflector shown in FIG. 3.

FIG. 13 is a perspective view, partially cut away, of the combination stove and barbecue grill of the present invention, with the burner tube partially broken away, the cooking grate pivoted upward, and the pivotally mounted heat diffuser rotated into its inverted position for stove cooking.

FIG. 14 is a perspective view, partially cut away, of the combination stove and barbecue grill of the present invention, with the cooking grate pivoted upward and the pivotally mounted heat diffuser rotated into its upright position for grilling.

DETAILED DESCRIPTION OF THE PREFERRED EMBODIMENT

Figure 1:
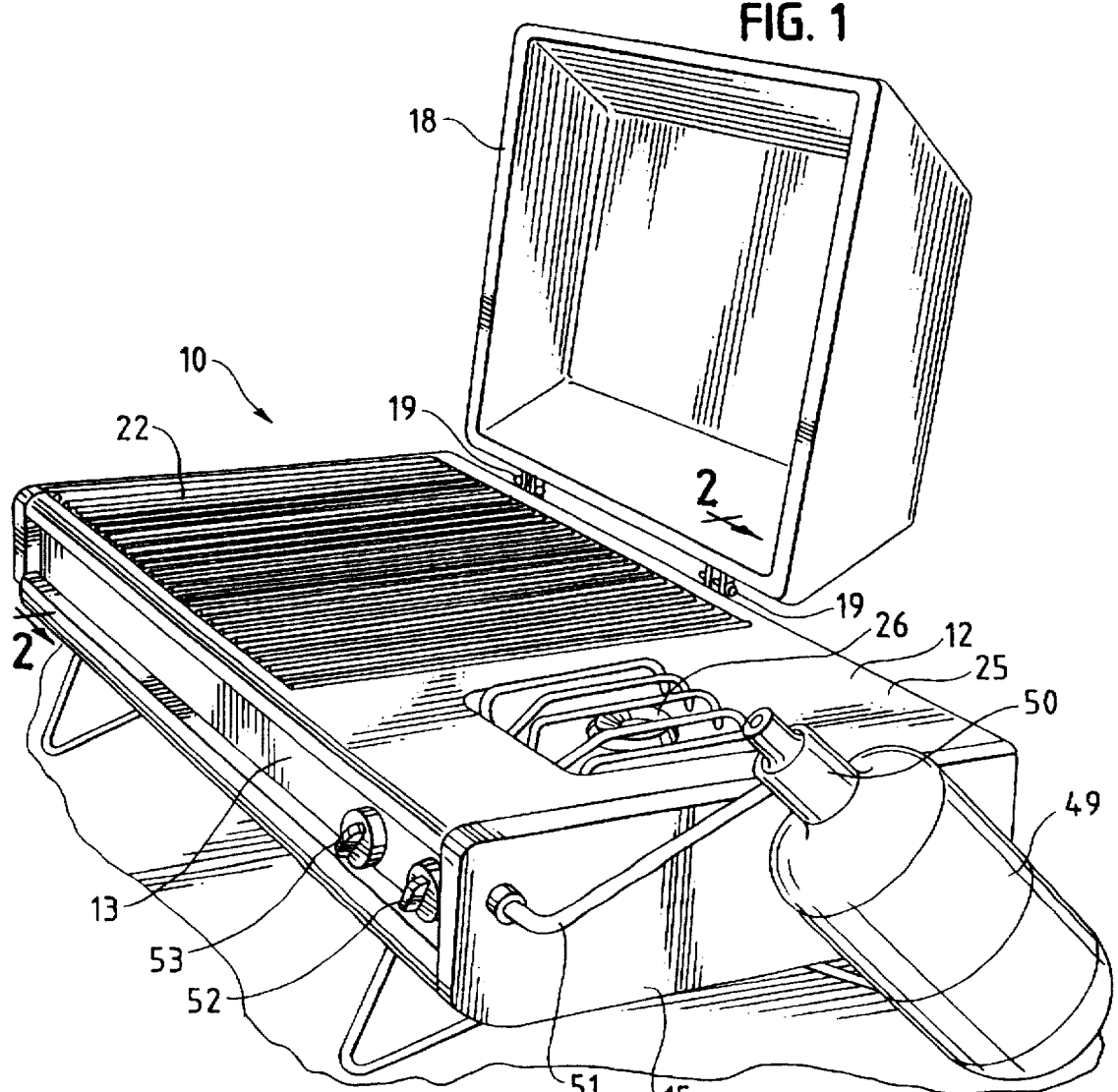
FIG. 1 is a perspective view of a portable cooking apparatus using the combination stove and barbecue grill of the present invention.
Figure 2:
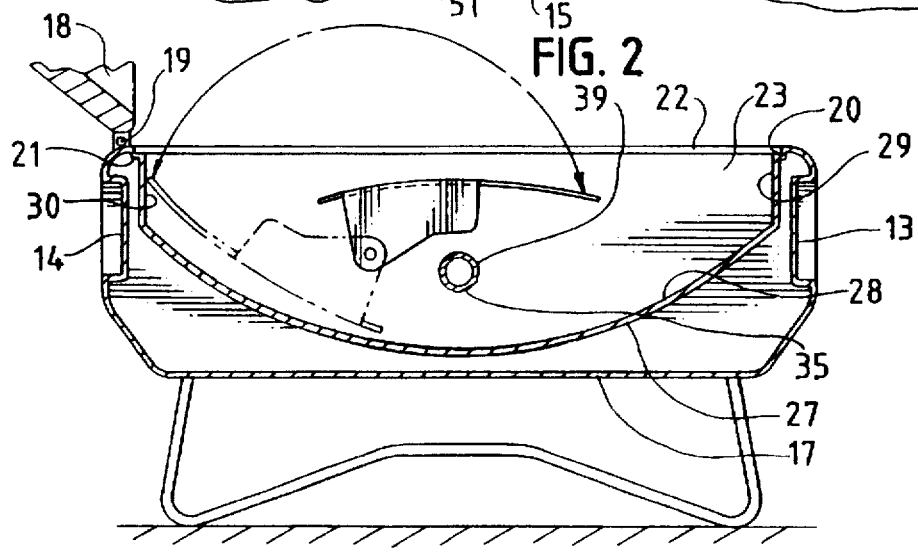
FIG. 2 is a cross-sectional view of one embodiment of the cooking apparatus shown in FIG. 1, taken along lines 2—2 of FIG. 1, with a pivotally mounted heat diffuser in its upright position for grilling shown in solid, and the heat diffuser in its inverted position for stove cooking shown in broken lines.

As shown in FIGS. 1 and 2, a portable cooking apparatus made in accordance with the present invention, generally referenced as 10, includes a housing 12 having a front wall 13, a rear wall 14, side walls 15 and 16 (FIG. 14), and a bottom wall 17. A lid 18 is hingedly mounted to the rear wall 14 by hinges 19.

The upper portions of the front and rear walls terminate in inwardly facing L-shaped flanges 20 and 21, respectively. A removable cooking grate 22 is supported by the flanges on the front and rear walls to provide a cooking surface.

An intermediate wall 23 extends between the front and rear walls and forms the right side of a heat chamber 24 below the grate. A top wall 25 extends between the intermediate wall 23 and the right side wall 15. The top wall is provided with an opening for conventional stove top burner 26. The stove top burner does not form any part of this invention and the details thereof are unnecessary. It is recognized that in embodiments where the stove top burner 26 is not utilized, the right side wall 15 becomes unnecessary and the intermediate wall 15 serves as the right side wall.

A heat deflector 27 is also supported by the flanges 20 and 21 of the front and rear walls. The heat deflector includes a parabolic heat-deflecting portion 28, front and rear upwardly extending portions 29 and 30, and outwardly extending flanges or tabs 31 and 32. Tabs 31 and 32 (FIGS. 3, 12) interlock with corresponding slots in the front and rear walls of the housing (not shown) to secure the heat deflector 27 in place. As illustrated in FIGS. 3 and 12, the deflector may further include upwardly extending flanges 33 on the right and left edges of the parabolic portion. The upwardly extending flanges 33 form side walls of a collection tray at the bottom of the deflector to collect grease and debris, without spilliage onto the side wall 16 and intermediate wall 23 of the housing. Upwardly extending flanges or tabs (not shown), preferably centrally located, may be provided on the front and/or rear portions 29 and 30 of the heat deflector for assisting in removing the deflector from the housing. Pushing the tabs inward will cause the horizontal tabs 31, 32 to separate from the slots in the front and rear walls of the housing. It is recognized that the upwardly extending flanges 33 may also be utilized to facilitate removing the deflector from the housing for cleaning, by gripping the flanges against the walls of the housing while exerting an upward force.

An elongated burner tube 35 (see also FIGS. 7–11) is mounted within the housing above the heat deflector. One end of the burner tube terminates in an upwardly extending flange 36 which is secured to the side wall 16 of the housing by screw 37. The other end of the burner tube terminates in an open inlet end 38 which extends through an opening 39 in the intermediate wall 23. The intermediate wall supports the burner tube. Thus, the diameter of the opening 39 in the intermediate wall is slightly larger than the diameter of the burner tube. A pair of air ports 40 extend through the burner tube adjacent the open end. A plurality of burner ports 41 extend through the front and rear sides of the burner tube along the length of the burner tube.

When fuel, for example, liquified petroleum fuel such as propane, is injected into the open end of the burner tube via a fuel tube 51, combustion air is aspirated through the air ports 40. A fuel/air mixture flows through the rows of burner ports 41, where it is ignited. The horizontal rows of burner ports spread the flame evenly on both sides of the tube. Horizontal positioning also prevents the burner from degrading prematurely due to overheating.

A parabolic-shaped heat diffuser 42 is pivotally mounted to the side wall 15 and the intermediate wall 23 by conventional methods, such as using bolts 44. A vertical mounting bracket or flange 43 on each side of the heat diffuser is pivotally mounted to the side wall and intermediate wall of the housing by the bolts 44. Bolting the heat diffuser to the housing is desirable because it allows removal of the diffuser for cleaning. The heat diffuser 42 is rotatable between an inverted position, as shown in FIG. 13, for stove cooking, and an upright position, shown in FIG. 14, for barbecue grilling. When in the upright position, the heat diffuser is disposed over the burner 35. When in the inverted position, the heat diffuser leaves the burner exposed to the cooking grate and is tilted into substantial alignment with the parabolic deflector 27. At least a portion of the heat diffuser may be positioned below the burner when the diffuser is in the inverted position. The concave surface of the parabolic heat deflecting portion 18 of the heat diffuser cooperates with the parabolic deflector to reflect radiant heat from the burner to the cooking grate. The pivot pins 44 preferably provide sufficient friction to retain the heat diffuser in the desired position.

As shown in FIG. 6, the heat diffuser 42 preferably includes several rows of apertures 45, 46, 47, 48 that increase in size as they approach the outer edges of the diffuser. The apertures, or heat diffuser holes, are designed to spread the hot products of combustion exiting the burner ports out toward the edges of the cooking grate, rather than straight up. No apertures are provided in the apex region near or at the center of the diffuser. When the heat diffuser is in the upright position, this imperforate area of the diffuser is directly over the burner tube 35 the apertures allow heat to pass through to diffuser toward the cooking grate 22. The increasing size of the apertures permits convection heat to escape upward, but forces most of the heat outward where it is needed. The rows of apertures are preferably staggered, such that successive rows of apertures are not in alignment, but every third row of apertures are aligned. In the preferred embodiment, there are four rows of apertures on either side of the unperforated apex region of the heat diffuser 42.

The unperforated portion of the diffuser protects the burner from food and grease drippings when the diffuser is in its upright position. Advantageously, when in its upright position the convex surface of the diffuser provides a hot surface on which grease dripping down from meat on the cooking grate vaporizes, releasing smoke which rises back up to food on the cooking grate, thus providing the meat with a desirable smokey taste typically associated with barbecue grilling.

In order to provide a heat diffuser that can resist extreme heat conditions that exist inside the grill, the diffuser 42, including the mounting brackets 43, is made from cold roll steel and has a porcelain finish. The porcelain finish also is easier to clean than aluminized steel or stainless steel.

Advantageously, the parabolic shape of the bottom or heat-deflecting portion 28 of the heat deflector 27 helps grease drippings and other debris which fall from the cooking grate, or off the sides or through the apertures of the heat diffuser, anywhere onto the heat deflector to gravitate to the lowest point of the deflector, directly under the burner tube. The grease will more likely vaporize there because it is closest to the burner tube and thus at a relatively hotter portion of the bottom of the heat deflector. Even if it does not fully vaporize, the grease or debris is collected in the collection tray formed by the bottom of the parabolic shaped heat deflecting portion 28 and the flanges 33 so it will not spill onto the walls of the housing when the heat deflector is removed for cleaning.

In the embodiment illustrated, fuel is supplied to the cooking apparatus by a disposable tank 49 of liquefied petroleum (LP) such as propane. The tank is connected to a conventional regulator and valve assembly 50, and a fuel tube 51 supplies fuel to the stove top burner 26 and to the burner tube 35. Control knobs 52 and 53 on the front wall 13 control the flow of fuel to the burner 26 and burner tube 35. As shown in FIG. 11 the end of the fuel tube which supplies fuel to the burner tube is equipped with a conventional orifice or jet which is positioned in the open inlet end of the burner tube. Fuel is injected from the orifice into the inlet end at high velocity.

The parabolic deflector 27 reflects radiant heat from the burner tube 35 back up toward the cooking grate 22, similar to the way a curved mirror reflects light. The parabolic shape tends to direct the radiant heat out to the front and rear edges of the cooking surface for even heat distribution over the cooking grate. Thus, the combination of the small burner ports on the linear tube burner 24 and the parabolic deflector 26 evenly distributes heat over the entire cooking surface.

Although the invention has been described with respect to certain embodiments thereof, it will be understood by those skilled in the art that it is not intended to be limited thereto and that changes and modifications can be made therein within the scope of the appended claims.

We claim:

1. A cooking apparatus comprising:
   a housing;
   a burner disposed in the housing;
   a food supporting surface disposable in the housing above the burner; and
   a heat diffuser rotatably mounted in the housing for movement between a first position, in which said heat diffuser is positioned between the food supporting surface and the burner in a region where the diffuser diffuses heat passing from the burner to the food supporting surface, so that heat is diffused across the food supporting surface, and a second positions in which said heat diffuser is positioned outside said region so that heat may pass from the burner to the food supporting surface without obstruction by the heat diffuser.

2. The cooking apparatus of claim 1, wherein said heat diffuser has a substantially parabolic shape having a convex surface and a concave surface, the concave surface facing the burner when the heat diffuser is in the first position.

3. The cooking apparatus of claim 2, wherein said heat diffuser includes a plurality of apertures therethrough.

4. The cooking apparatus of claim 3, wherein said heat diffuser includes an imperforate portion which is positioned above said burner when the heat diffuser is in the first position.

5. The cooking apparatus of claim 2, wherein the concave surface of said heat diffuser reflects heat from the burner toward the food supporting surface when the heat diffuser is in the second position.

6. The cooking apparatus of claim 1, wherein said burner comprises an elongated tube having front and rear portions, each of the front and rear portions being provided with a plurality of longitudinally spaced burner holes.

7. The cooking apparatus of claim 1, further comprising a deflector mounted in the housing below said burner and having a substantially parabolic shape with a concave surface facing said food supporting surface.

8. The cooking apparatus of claim 1, wherein at least a portion of said heat diffuser is positioned below the burner when the heat diffuser is in the second position.

9. A cooking apparatus comprising:
   a housing having a front wall, a rear wall, and left and right side walls;
   a removable cooking grate mounted on top of said housing;
   an elongated burner tube extending between said left and right side walls;
   a deflector mounted in said housing below said burner and extending between said front wall and said rear wall; and
   a heat diffuser pivotally mounted to at least one of said side walls, said heat diffuser being rotatable between a first position, in which said heat diffuser is positioned between said cooking grate and said burner tube in a region where the heat diffuser diffuses heat passing from the burner tube to the cooking grate, so that heat is diffused across the cooking grate, and a second positions in which said heat diffuser is outside said region and said linear tube burner is directly exposed to said cooking grate.

10. The cooking apparatus of claim 9, said burner tube having front and rear portions, each of the front and rear portions being provided with a plurality of longitudinally spaced burner holes.

11. The cooking apparatus of claim 9, wherein said deflector has a substantially parabolic shape with a concave surface facing said cooking grate.

12. The cooking apparatus of claim 11, said deflector further comprising vertical portions at said front and rear walls of the housing.

13. The cooking apparatus of claim 12, said deflector further comprising mounting flanges extending from said vertical portions for supporting the deflector on said front and rear walls of the housing.

14. The cooking apparatus of claim 9, said heat diffuser having a substantially parabolic shape, first and second edges, a convex surface and a concave surface, the convex surface facing the cooking grate when the heat diffuser is in the first position.

15. The cooking apparatus of claim 14, wherein said heat diffuser includes an imperforate portion which is positioned above the burner when the heat diffuser is in the first position, and a plurality of rows of apertures extending between said imperforate portion and said first and second edges, said rows of apertures having increasing diameter with proximity to said first and second edges.

16. The cooking apparatus of claim 15, said rows of apertures being staggered.

17. A cooking apparatus comprising:
   a housing;
   a burner disposed in the housing;

a food supporting surface disposable in the housing above the burner; and a heat diffuser rotatably mounted in the housing for movement between a first position in which said heat diffuser is positioned between the food supporting surface and the burner and a second position in which said heat diffuser is positioned so that heat may pass from the burner to the food supporting surface without obstruction by the heat diffuser, said heat diffuser having a substantially parabolic shape with a convex surface and a concave surface, the concave surface facing the burner when the heat diffuser is in the first position, said heat diffuser further including a plurality of apertures and an imperforate portion which is positioned above said burner when the heat diffuser is in the first position.

18. A cooking apparatus comprising:

a housing having a front wall, a rear wall, and left and right side walls;

a removable cooking grate mounted on top of said housing;

an elongated burner tube extending between said left and right side walls;

a deflector mounted in said housing below said burner and extending between said front wall and said rear wall; and a heat diffuser pivotally mounted to at least one of said side walls, said heat diffuser being rotatable between a first position, in which said heat diffuser is positioned between said cooking grate and said burner tube, and a second position, in which said heat diffuser leaves said linear tube burner exposed to said cooking grate, said diffuser having a substantially parabolic shape, first and second edges, a convex surface and a concave surface, the convex surface facing the cooking grate when the heat diffuser is in the first position, said heat diffuser further including an imperforate portion which is positioned above the linear tube burner when the heat diffuser is in the first position, and a plurality of rows of apertures extending between said imperforate portion and said first and second edges, said rows of apertures having increasing diameter with proximity to said first and second edges.

19. The cooking apparatus of claim 18, said rows of apertures being staggered.

* * * * *